United States Patent [19]

Kubo

[11] 3,832,636

[45] Aug. 27, 1974

[54] TRANSCEIVER WITH TIME DIVISION MEANS FOR INDICATING THE PRESENCE OF AN EMERGENCY CHANNEL SIGNAL WHILE RECEIVING INFORMATION ON A NORMAL CHANNEL

[75] Inventor: Mutsuo Kubo, Tokyo, Japan

[73] Assignee: Tokyo Shibaura Electric Company, Limited, Kanagawa-ken, Japan

[22] Filed: Nov. 2, 1972

[21] Appl. No.: 303,023

[52] U.S. Cl. .................... 325/25, 325/466, 325/470

[51] Int. Cl. ............................................ H04b 1/40

[58] Field of Search ....... 325/15, 64, 466, 364, 492, 325/21, 22, 25, 468, 470, 472; 343/180, 181; 179/15 BF; 340/413

[56] References Cited

UNITED STATES PATENTS

| | | | |
|---|---|---|---|
| 2,652,453 | 9/1953 | Alexander | 343/180 |
| 3,345,569 | 10/1967 | Casterline et al. | 325/15 |
| 3,482,166 | 12/1969 | Gleason | 325/468 |
| 3,496,467 | 2/1970 | Lundgren | 325/466 |
| 3,736,512 | 5/1973 | Gowan | 179/15 BF |
| 3,750,032 | 7/1973 | Andrews | 325/470 |

*Primary Examiner*—Albert J. Mayer
*Attorney, Agent, or Firm*—Oblon, Fisher, Spivak, McClelland & Maier

[57] ABSTRACT

A transceiver includes a time division receiving system which shares reception between a normal channel and an emergency channel. The normal channel is shared for a sufficient time to minimize loss of normal channel signal information while providing means for indicating reception of a signal on the emergency channel and displaying the reception by means of an indicator.

12 Claims, 16 Drawing Figures

PATENTED AUG 27 1974 3,832,636

SHEET 4 OF 7

PATENTED AUG 27 1974 3,832,636

TRANSCEIVER WITH TIME DIVISION MEANS FOR INDICATING THE PRESENCE OF AN EMERGENCY CHANNEL SIGNAL WHILE RECEIVING INFORMATION ON A NORMAL CHANNEL

BACKGROUND OF THE INVENTION

1. Field of the Invention

The present invention generally relates to a transceiver and more particularly to a unique transceiver having a time division receiving system which time-shares reception between two channels, for example, a normal channel and an emergency channel.

2. Description of the Prior Art

Transceivers are widely adopted for civil use and many channels are shared in civil band use. A certain channel of the civil band, i.e., the ninth channel in the 23 channels of the 27 MHz civil band in U.S.A., is reserved for emergency telecommunication. It is desirable that a transceiver be capable of automatically receiving an emergency channel signal while it is tuned to receive a normal channel signal. In the past, in order to satisfy such a requirement, a special receiving system for emergency reception has been installed in the transceiver. While such systems have been somewhat satisfactory, they are expensive and inconvenient for utilization in a portable transceiver.

SUMMARY OF THE INVENTION

Accordingly, one object of the present invention is to provide a new and improved transceiver which is capable of alerting the user upon the reception of an emergency channel signal while operating in its normal channel receiving mode.

Another object of the invention is to provide a new and improved portable transceiver which is capable of locking the receiving system onto a first arrived channel signal.

Briefly, in accordance with this invention, the foregoing and other objects are in one aspect attained by the provision of a transmitting and receiving antenna, a transmitting system connected to the antenna, a receiving system connected to the antenna, and a transmission-reception transfer switch for alternatively connecting the system for transmission or reception operation. The receiving system includes means for time divisional reception of a normal channel signal and an emergency channel signal. The time sharing of reception between the normal channel and emergency channel is adjusted to maintain clear audio information in the normanl channel signal and to provide means for indicating reception of the emergency channel signal.

BRIEF DESCRIPTION OF THE DRAWINGS

Other objects and features of the invention will be better understood by reference to the following detailed description when considered in connection with the accompanying drawings, in which like reference characters designate the same or similar parts throughout the figures thereof and wherein.

DETAILED DESCRIPTION OF THE PREFERRED EMBODIMENTS

Figure 1:
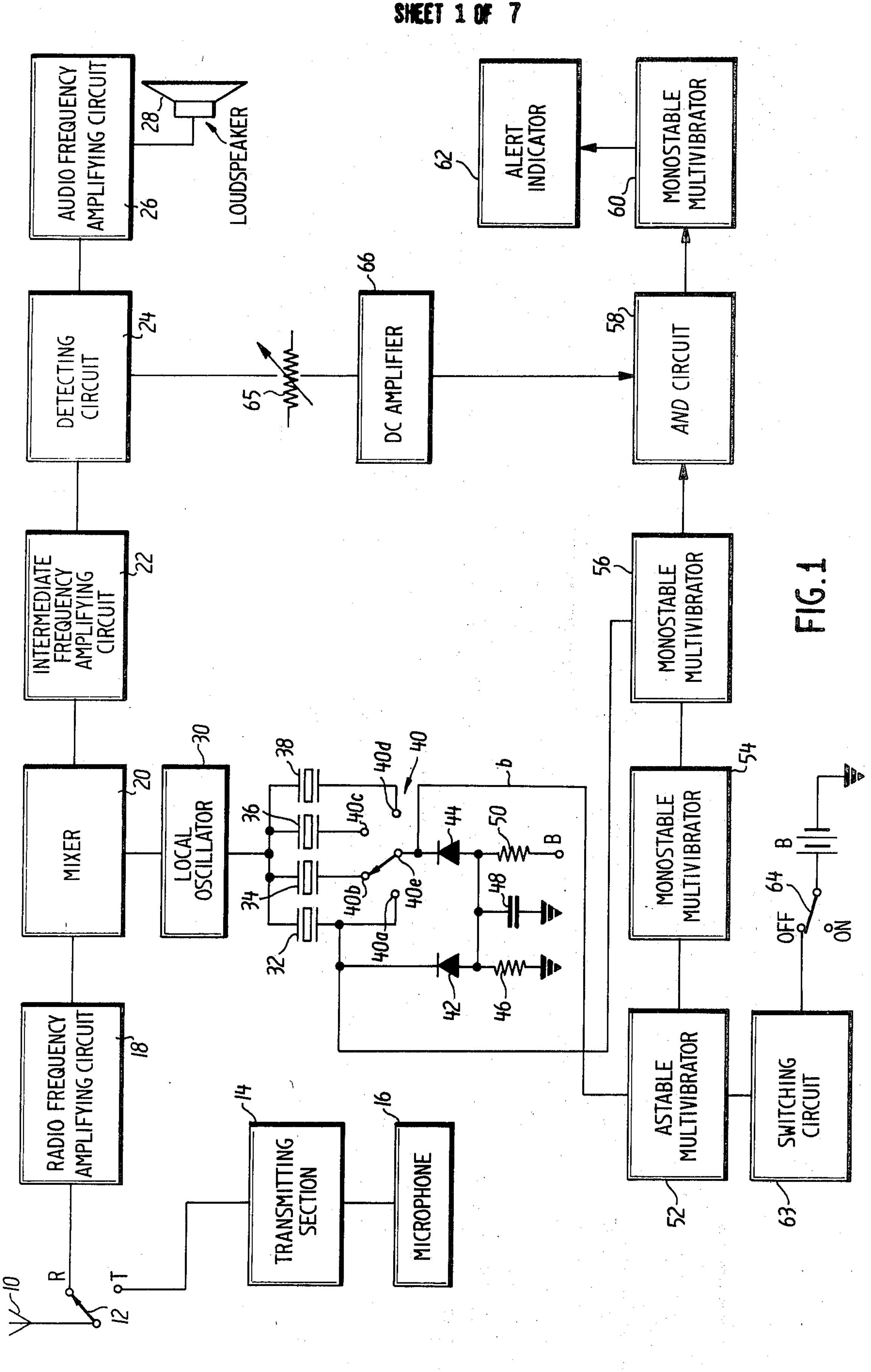
FIG. 1 is a block diagram of a transceiver according to one preferred embodiment of the present invention.

Referring now to the drawings, wherein like reference numerals indicate identical or corresponding parts throughout the several views and more particularly to FIG. 1 thereof, wherein a transceiver with a time division receiving system according to the present invention is shown. In the transceiver, a transmitting and receiving antenna 10 is shown as being connected to a transmission-reception transfer switch 12. A transmitting terminal T of the transmission-reception transfer switch 12 is connected to a conventional transmitting section 14 and a conventional microphone 16. An audio signal generated at the microphone 16 modulates a carrier signal at the transmitting section 14. The modulated carrier signal is amplified and then radiated from the antenna 10 as is well known in the transmitter art.

A reception terminal R of the transmission-reception transfer switch 12 is connected to radio frequency amplifying circuit 18. An output signal of the radio frequency amplifying circuit 18 is applied to a mixer 20, followed by application to an intermediate frequency amplifying circuit 22, a detecting circuit 24, an audio frequency amplifying circuit 26 and finally to a loud speaker 28. A local oscillator 30 is connected to the mixer 20, and one terminal of a plurality of quartz resonators 32, 34, 36 and 38 is connected to the local oscillator 30. A particular quartz resonator may be chosen corresponding to the desired channel that an operator wants to receive and a quartz resonator, for example, quartz resonator 32 in the embodiment, is used for emergency channel reception. The other terminals of the quartz resonators 32, 34, 36 and 38 are connected to respective contacts 40_a_, 40_b_, 40_c_ and 40_d_ of a channel selection switch 40. A common terminal 40_e_ of the channel selection switch 40 is rotatably mounted so that it may selectively make contact with a desired quartz resonator. The contact 40_a_ for the emergency channel is connected to a cathode of a first diode 42 and the rotatably mounted contact 40_e_ is connected to a cathode of a second diode 44. Anodes of the first and second diodes are lead to a ground through a parallel circuit which consists of a resistor 46 and a condenser 48. The parallel circuit is also connected to an electric source B through a resistor 50.

The rotatably mounted contact 40_e_ is connected to a time division receiving controller which includes a series arrangement of an astable multivibrator 52, a first monostable multivibrator 54, a second monostable multivibrator 56, an AND circuit 58, a third monostable multivibrator 60 and an alert indicator 62. The astable multivibrator 52 is connected to the electric source B through a switching circuit 63 and a division reception selecting switch 64. An output of the detecting circuit 24 is partly applied to the AND circuit 58 through a variable resistor 65 and a DC amplifier 66.

Figure 2:
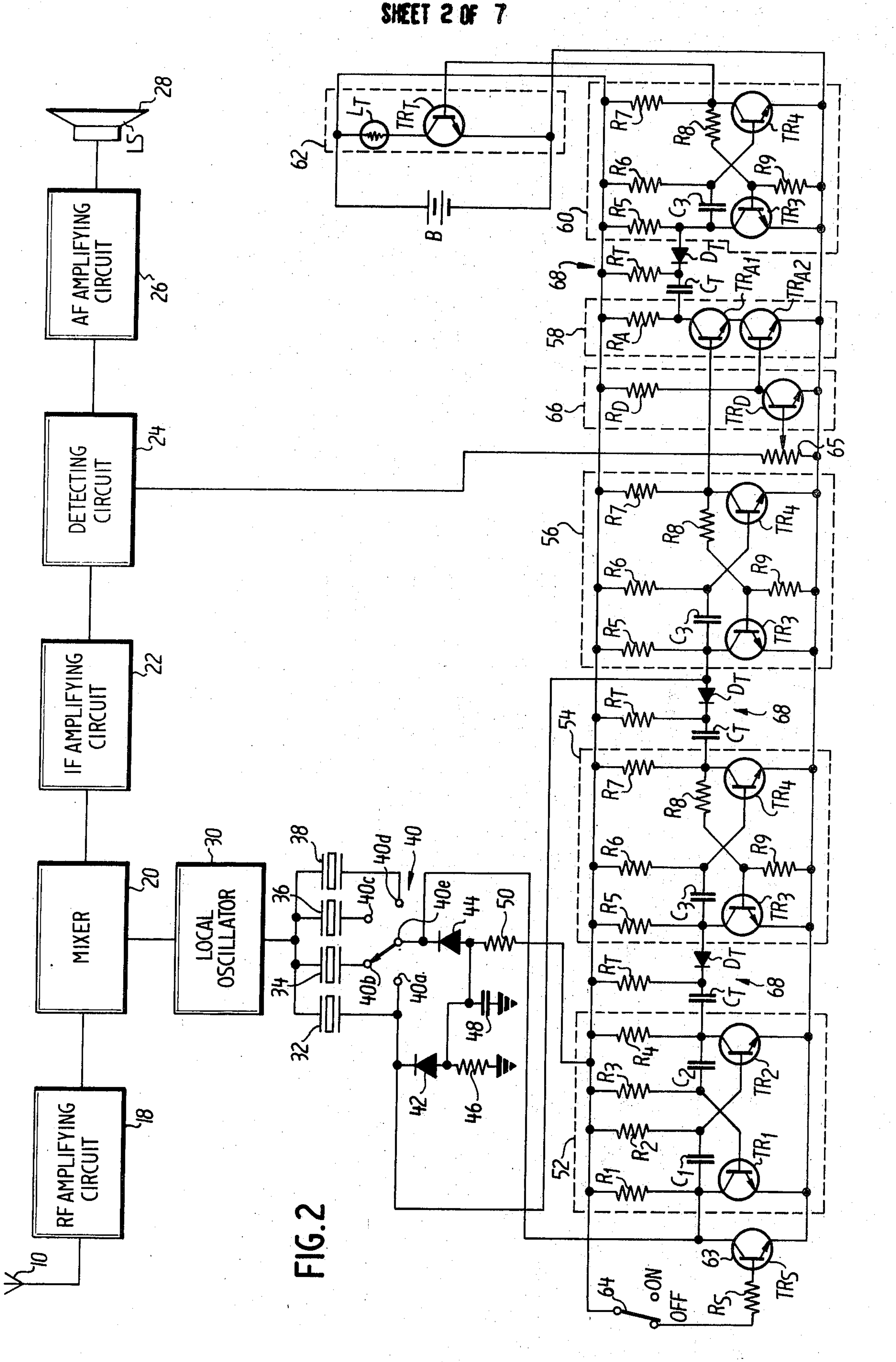
FIG. 2 is a circuit diagram showing details of the main portion of the transceiver illustrated in FIG. 1.

A particular operation of the reception section of the transceiver will be explained with reference to FIG. 2 and FIG. 3. When the time division reception selecting switch 64 is at its on position, the operator can be informed when a signal on the emergency band is received, even though the receiver is operating in a normal receiving condition and not specifically tuned to the emergency channel.

Figures 3A, 3B, 3C, 3D, 3E, 3F, 3G, 3H, 3I, 3J:
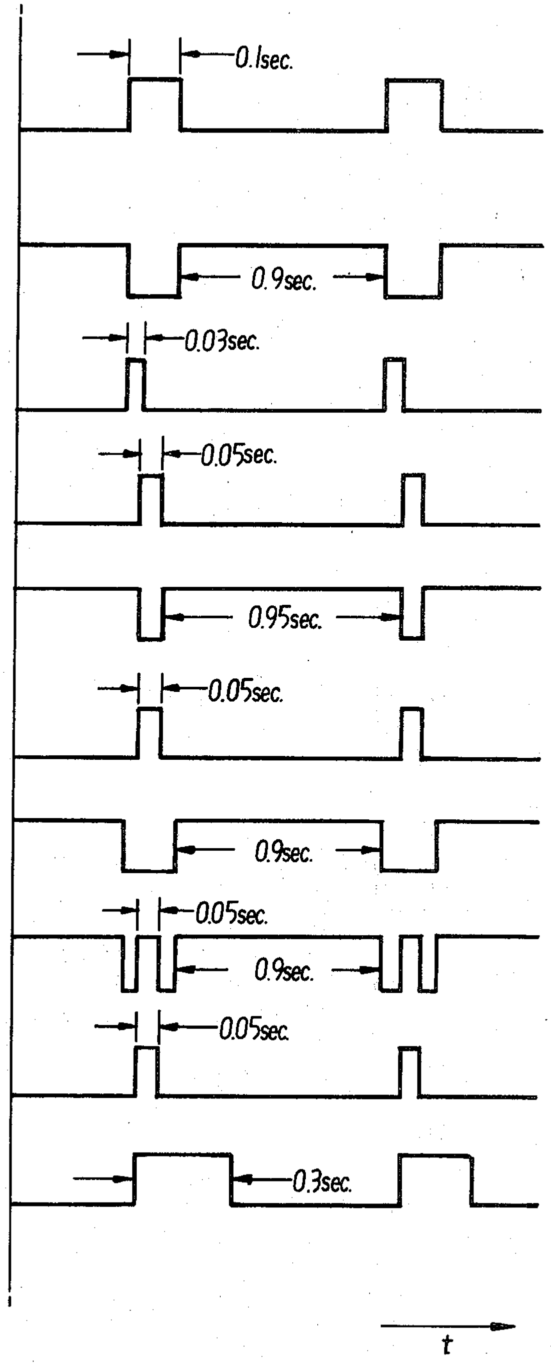
FIGS. 3A to 3J, respectively, show output waveforms at some portions of the transceiver shown in FIG. 1 and FIG. 2.

More specifically, the switching circuit 63 includes a resistor $R_s$ and a transistor $T_{Rs}$ which is connected to the electric source B and is initially in an off-state. The astable multivibrator 52 includes transistors $TR_1$, $TR_2$, resistors $R_1$, $R_2$, $R_3$, $R_4$ and capacitors $C_1$, $C_2$ and generates pulses of two different pulse widths, e.g., 0.9 sec. and 0.1 sec. as is illustrated in FIG. 3A and FIG. 3B. For the time of 0.9 sec., the diode 44 is in an on-state and a normal channel corresponding to quartz resonator 34 is in operation. The first monostable multivibrator 54 includes transistors $TR_3$, $TR_4$, resistors $R_5$, $R_6$, $R_7$, $R_8$ $R_9$ and a capacitor $C_3$ and is triggered through a trigger circuit 68 which includes a capacitor $C_I$, a resistor $R_T$ and a diode $D_T$ by the pulse having a 0.1 sec. pulse width. In response to the 0.1 sec. pulse, monostable multivibrator 54 generates a pulse having a pulse width of 0.03 sec., as is shown in FIG. 3C. The second monostable multivibrator 56, has a circuit arrangement identical to that of monostable multivibrator 54 and is triggered by the output pulse of the first monostable multivibrator 54 through the trigger circuit 68. The second monostable multivibrator 56 generates two pulses, as is illustrated in FIG. 3D and FIG. 3E, having pulse widths of 0.05 sec and 0.95 sec respectively. The diode 42 is turned on by the pulse illustrated in FIG. 3E for a period of 0.05 sec. and the quartz resonator 32 corresponding to the emergency channel 9 is energized during that period of time.

As was described hereinbefore, the local oscillator 30 generates a frequency corresponding to a normal channel reception for 0.9 sec. and generates an emergency channel frequency for 0.05 sec. and continuously repeats the aforementioned time-division receiving operation.

The other output pulse of the monostable multivibrator 56, as illustrated in FIG. 3D, is applied as one input to an AND circuit 58 which includes transistor $TR_{A1}$, $TR_{A2}$ and a resistor $R_A$. An output of the detecting circuit 24 is applied to the second input of the AND circuit 58 through a variable resistor 65 and a DC amplifier 66, which includes a transistor $TR_D$ and a resistor $R_D$.

Should an emergency channel signal arrive under these conditions, the output of the detecting circuit 24 caused by reception of a signal on the emergency channel 9 is applied to the AND circuit 58 through the variable resistor 65. The output of the DC amplifier 66 is shown in FIG. 3F and is applied to the AND circuit 58 as an input thereof. The AND circuit 58 is turned on when two inputs thereof, i.e., the pulses shown in FIG. 3D and the pulse shown in FIG. 3F, are applied simultaneously. The output of the AND circuit 58 shown in FIG. 3I causes the third monostable multivibrator 60 and the alert indicator 62 which includes a lamp $L_T$ and a transistor $TR_T$, to turn on. Lamp $L_T$ is energized for a period of time, such as 0.3 sec., in response to voltage (FIG. 3J) at the output terminal of the third monostable multivibrator 60. FIG. 3G and FIG. 3H respectively show an output of the DC amplifier 66 during a normal channel reception in the absence of an emergency channel signal and an output during a simultaneous reception of a normal channel signal and an emergency channel signal.

According to the time-division reception means of this invention, reception of a normal channel signal does not occur for 0.1 sec. during each one second of reception. However, virtually no degradation in the quality of the normal channel signal is perceivable.

When the alert indicator signals the reception of a signal on the emergency channel, operator responds by rotating contact 40*e* of the channel selection swtich 40 to contact the emergency channel contact 40*a*. In addition, the operator turns the time division reception selecting switch 64 to off, causing the transistor $TR_s$ of the switching circuit 63 to turn on and the astable multivibrator to cease oscillating. The diode 44 maintains its on-state and the multivibrators 54, 56, 60 are disabled due to the quiescence of the astable multivibrator 52. As a result thereof, the quartz resonator 32 for the emergency channel 9 supplies the prescribed local oscillating frequency to the mixer 20 and the receiver is tuned to the emergency channel. The operator can also tune to a normal channel audio signal by manually selecting a proper quartz resonator for normal channel without a time division reception operation by manually tuning the channel selected switch 40 to the desired crystal while maintaining the switch 64 in its off position.

As is described hereinabove, the transceiver of the present invention is able to detect and indicate the arrival of the emergency channel signal without any other receiving equipment for the emergency channel use.

Figure 4:
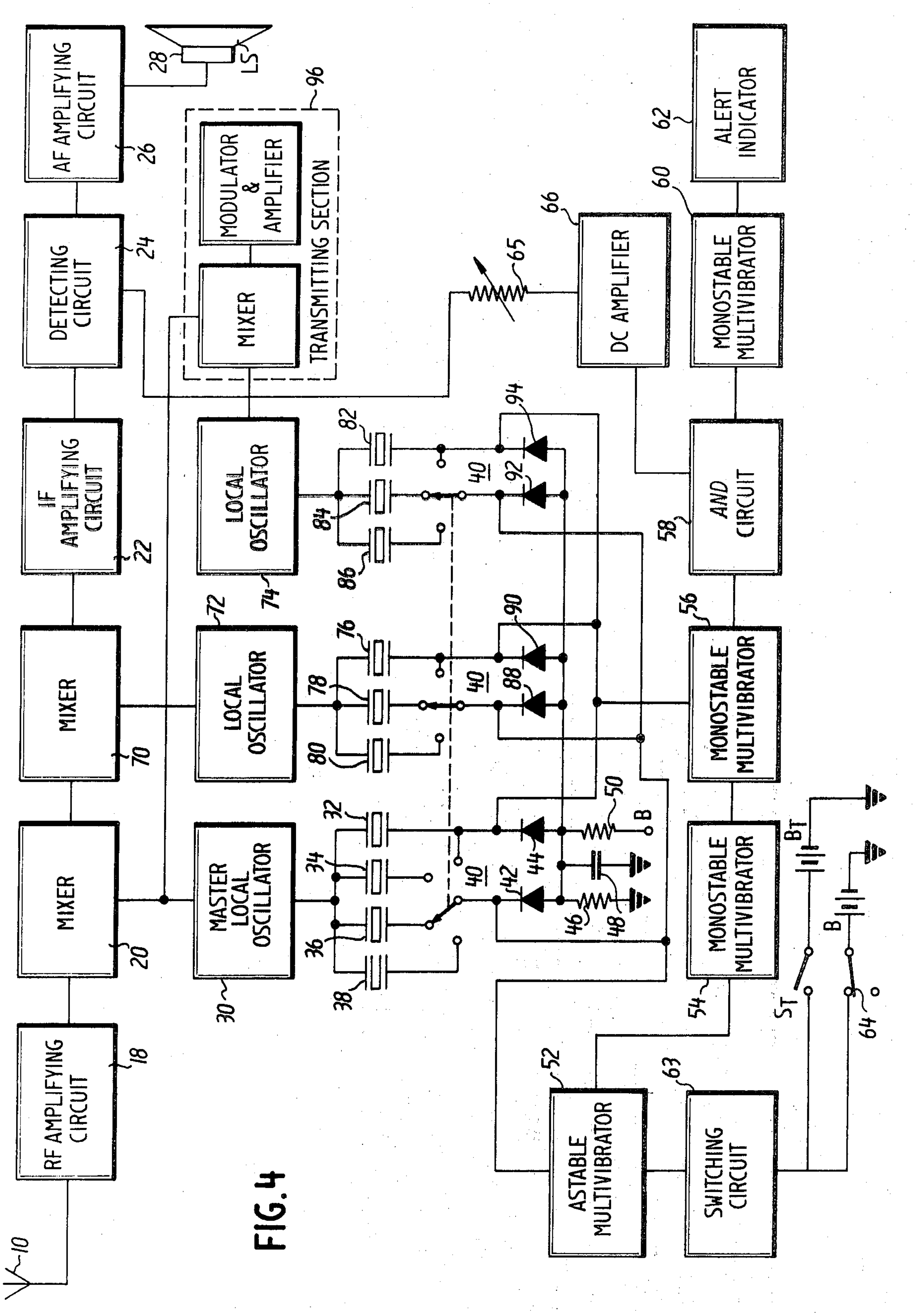
FIG. 4 is a block diagram of a receiving system of a transceiver according to another preferred embodiment of the present invention.

FIG. 4 shows another and alternative preferred embodiment of the present invention, wherein a signal on the emergency channel is suppressed during the changing of a receiving operation of the emergency channel into a transmitting operation of a normal channel. FIG. 4 shows a double Super-Heterodyne type receiver and an additional mixing stage which includes a mixer 70, a second local oscillator 72, quartz resonators 76, 78, 80, and diodes 88 and 90 which are disposed adjacent to the first mixing stage 20. In addition, a third local oscillator 74, quartz resonators 82, 84, 86 and diodes 92, 94 for the mixing stage of the transmitting section are provided. The signals from the master local oscillator 30 and the local oscillator 74 are mixed at a mixer 98 of a transmitting section 96 and then modulated and power amplified at a modulator and amplifier 100.

When a normal channel signal is telecommunicated during reception of a signal on the emergency channel, any burst signal on the emergency channel after setting the transmitting operation on the normal channel is suppressed by supplying a controlling signal, i.e., a D.C. voltage from transmitter electric source $B_T$ to the astable multivibrator 52 by closing switch $S_T$, preventing operation of the emergency channel quartz resonator 32.

Figure 5:
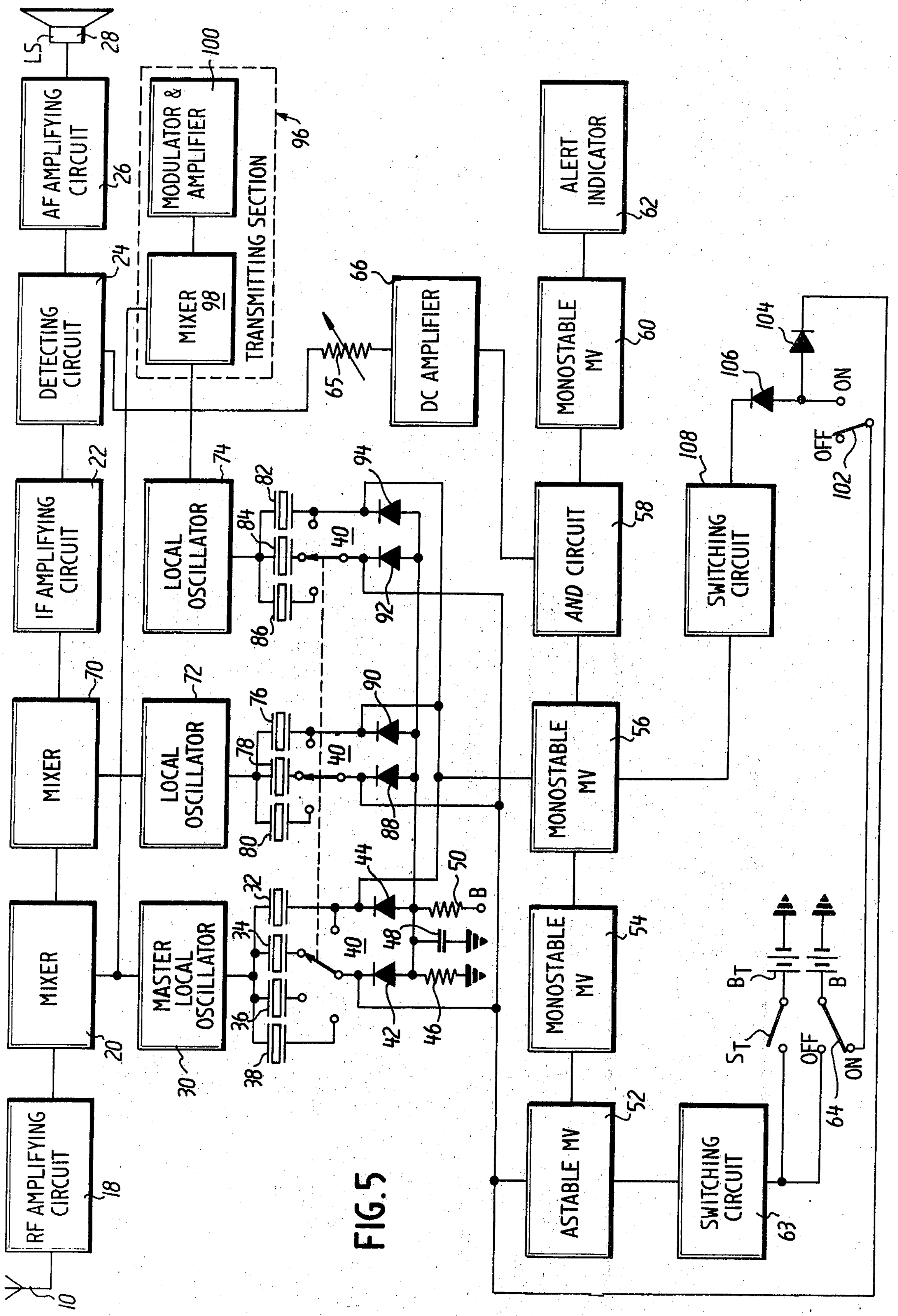
FIG. 5 is a block diagram of a receiving system of a transceiver according to still another preferred embodiment of the present invention.

FIG. 5 shows a modification of the embodiment illustrated in FIG. 4. A switch 102 is provided for the convenient reception of the emergency channel. Switch 102 is connected to the electric source B through the on-terminal of the time division reception selecting switch 64. After recognition of the lighting of an alert indicator 62, the operator by closing switch 102 applies the source voltage to the astable multivibrator 52 through a diode 104, and to the monostable multivibrator 56 through a diode 106 and a switching circuit 108 thereby providing for emergency channel reception.

Figure 6:
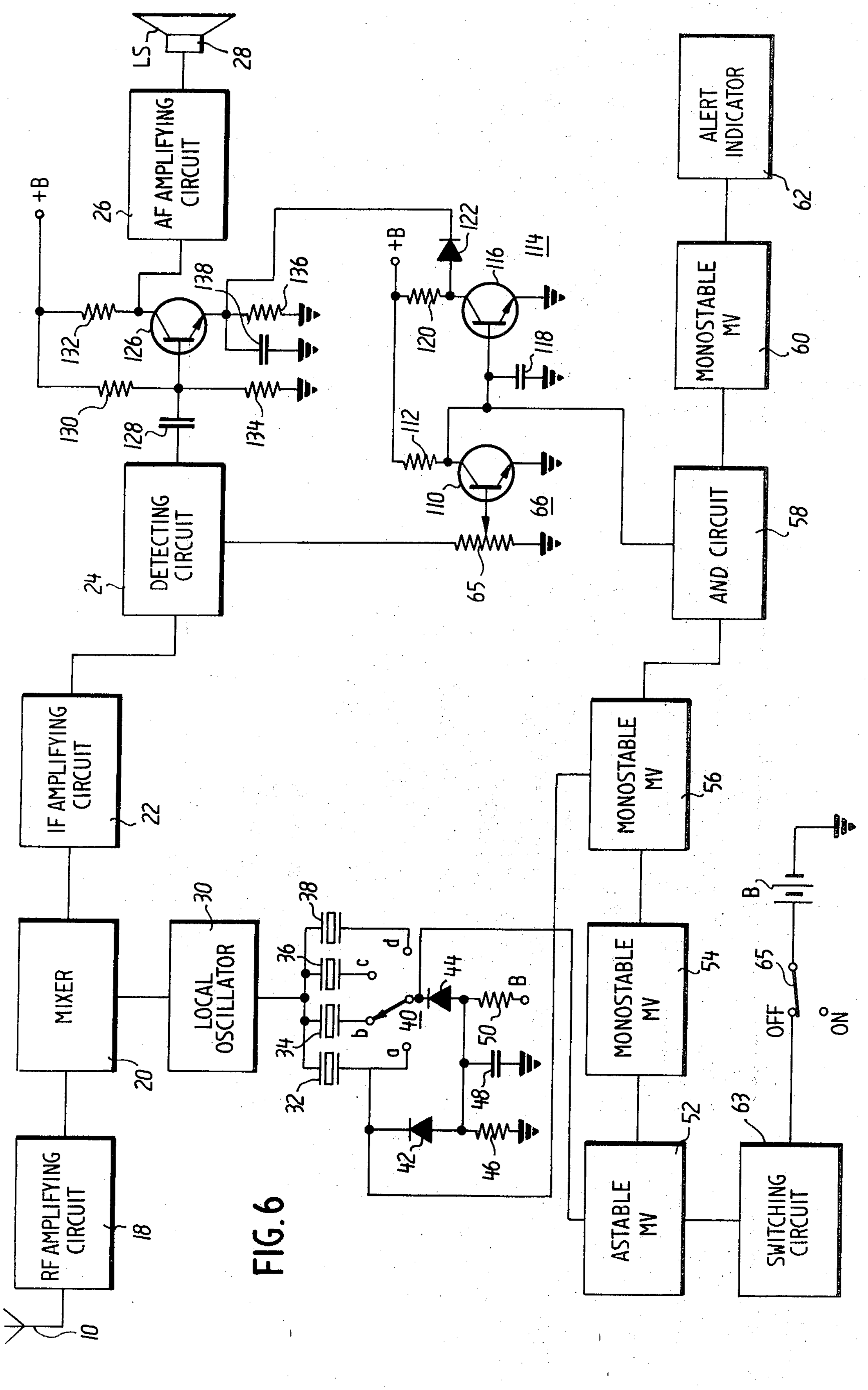
FIG. 6 is a block diagram of a receiving system of a transceiver according to a further and alternative preferred embodiment of the present invention; and, FIG. 7 is a block diagram of a receiving system of a transceiver according to a still further preferred and alternative embodiment of the present invention.

FIG. 6 shows a further embodiment of the present invention which can function as a squelch control for nullifying a noise output when no signal is received. This is very effective especially for FM electromagnetic wave telecommunication. An output signal of the DC amplifier 66 which includes a transistor 110 and a resistor 112 is applied to a squelch adjustment circuit 114. The squelch adjustment control includes a squelch adjustment transistor 116, a condenser 118 and a resistor 120. An output of the squelch adjustment circuit 114 is applied through a diode 122 to the emitter electrode of an audio frequency amplifying transistor 126 acting as one of the amplifying stages 124 of the audio frequency amplifying circuit 26. The amplifying stage 26 is coupled to the detecting circuit 24 through a coupling condenser 128, resistors 130, 132, 134, 136 and a condenser 138. The squelching level is determined by adjusting the variable resistor 65.

Figure 7:
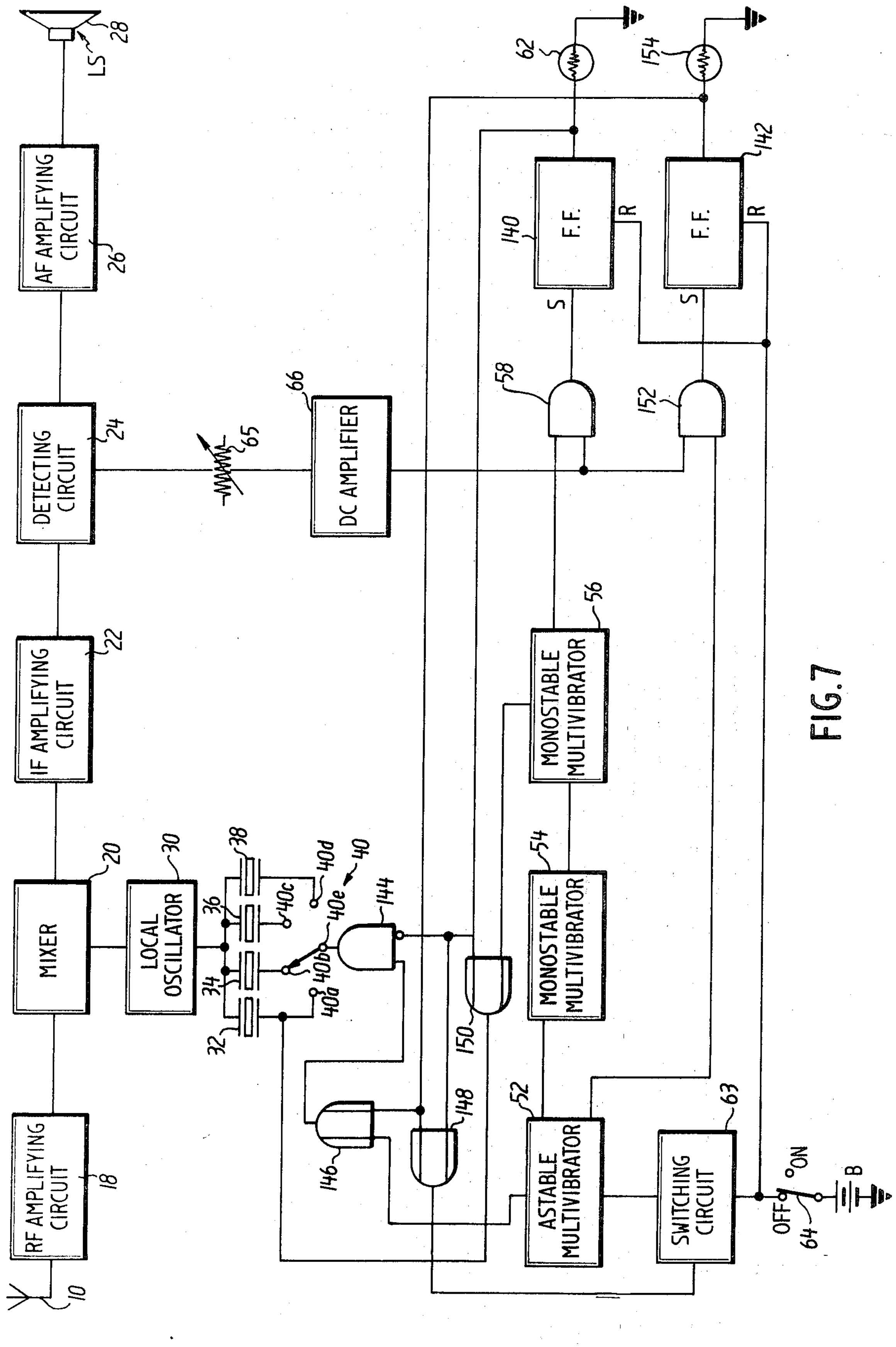

FIG. 7 shows a still further preferred embodiment of the present invention, wherein an unnecessary channel is locked out when a signal of either an emergency channel or a normal channel is telecommunicated. When the time division reception selecting switch 64 is turned off, oscillation of the astable multivibrator 52 is stopped and flip-flop circuits 140, 142 are reset. An AND gate 144 supplies a selecting signal for the quartz resonator 34 by the application of a logical 1 signal from the astable multivibrator 52 through an OR gate 146 and a logical 0 signal from the flip-flop circuit 142. In this circuit condition, telecommunication on the normal channel is achieved. On the other hand, when the time division receiving selecting switch 64 is set at its on-position, the astable multivibrator 52 begins to oscillate and accordingly the monostable multivibrators 54 and 56 also begin to oscillate. An output of the astable multivibrator 52 is applied to the terminal **40*e* of the channel selecting switch 40 through the OR gate 146 and the AND gate 144, and an output of the monostable multivibrator 56 is applied to the terminal 40*a* of the channel selecting switch 40 through an OR gate 150**. Thus, the transceiver accomplishes time-division reception of the normal and emergency channel as is explained in the former description.

When a signal on a normal channel is received, a logical 1 signal from the D.C. amplifier 66 and a logical 1 signal from the astable multivibrator 52, as is illustrated in FIG. 3B, are applied to the AND gate 152. A logical 1 output from the AND gate 152 sets the flip-flop circuit 142, and the output of the flip-flop circuit 142 turns the light 154 on. The output of the flip-flop circuit 142 is also applied to the switching circuit 63 through an OR gate 148 and oscillation of the astable multivibrator 52 is stopped. The output of the flip-flop circuit 142 is also applied to the OR gate 146 and then to the AND gate 144 to supply a channel selecting signal for a normal channel reception.

When a signal on the emergency channel is received, a logical 1 signal from the D.C. amplifier 66 and a logical 1 signal from the monostable multivibrator 56, as is shown in FIG. 3D, are applied to the AND circuit 58. A logical 1 output from the AND circuit 58 sets the flip-flop circuit 140 and turns the emergency channel light 62 on. The output signal from the flip-flop circuit 140 is applied to the switching circuit 63 through the OR gate 148 to stop the oscillation of the astable multivibrator 52. The AND gate 144 does not supply a channel selection signal to the channel selection terminal **40*e* because a logical 0 signal from the normally logical 1 output of the flip-flop circuit 140 is supplied thereto. The quartz resonator 32 for the emergency channel operates because the channel selecting signal is supplied thereto by the OR gate 150 thereby locking operations onto the emergency channel. When the emergency channel reception is over and it is desired to release the aforementioned channel lock, switch 64 should be turned to its off position to reset the flip-flop circuits 140 and 142**.

According to the above described embodiment, the reception of the emergency channel can be displayed and the operation of the unnecessary channel locked out. When a channel lock operation is necessary, but a display of the emergency channel is unnecessary, it is easily effected by applying, for example, a 50 percent duty factor signal from the astable multivibrator 52 directly to the AND gates 58 and 152 and to the OR gate 150.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A receiver for receiving signals on a plurality of different frequency channels which include an emergency channel and a normal channel, which comprises:

means for generating a signal corresponding in frequency to the channel desired to be received;

means for tuning said generating means to said desired frequency;

means connected to said tuning means for causing said tuning means to be tuned to a frequency corresponding to the frequency of said emergency channel for a preselected time period which is small compared with the time said tuning means is tuned to said normal channel; and means for indicating the presence of a received signal on said emergency channel while said receiver is receiving information on said normal channel.

2. A receiver for receiving signals on a plurality of different frequency channels which include an emergency channel and a normal channel, which comprises:

first switch means for selecting a normal channel desired to be received, means responsive to said first selecting means for generating a signal corresponding in frequency to the frequency of said desired normal channel;

control means connected to said generating means for causing said generating means to periodically generate a signal corresponding in frequency to the frequency of said emergency channel while said first selecting means is switched to said normal channel; and means for indicating the reception of a signal on said emergency channel while said first selecting means is switched to said normal channel whereby the operator of said receiver may be advised of the presence of an emergency signal on said emergency channel while still receiving information on said normal channel.

3. The receiver according to claim 2, wherein said control means comprises means for gating said generating means to allow said normal channel signal to be generated for a time period substantially longer than the time period of generation of said emergency channel signal.

4. The receiver according to claim 3 wherein said gating means includes means for establishing said time period of generation of said normal channel signal to be approximately 90 percent of the total "ON" time of said receiver.

5. A transceiver having a plurality of different frequency channels which include an emergency channel and a normal channel, which comprises:

a transmitter for transmitting information-bearing signals, a receiver for receiving information-bearing signals;

means for switching said transceiver from its transmitting mode to its receiving mode;

said receiver including:

first switch means for selecting a normal channel desired to be received, means responsive to said first selecting means for generating a signal corresponding in frequency to the frequency of said desired normal channel;

control means connected to said generating means for causing said generating means to periodically generate a signal corresponding in frequency to the frequency of said emergency channel while said first selecting means is switched to said normal channel; and means for indicating the reception of a signal on said emergency channel while said first selecting means is switched to said normal channel whereby the operator of said receiver may be advised of the presence of an emergency signal on said emergency channel while still receiving information on said normal channel.

6. The transceiver according to claim 5 further including means for supressing a burst signal received on said emergency channel while said switching means is switched from said receiving mode to said transmitting mode.

7. The transceiver according to claim 6 further comprising second switch means for selecting said emergency channel to be received after said indicating means indicates the presence of said emergency channel signal.

8. The transceiver according to claim 5 further comprising squelch control means for nullifying received signals having a magnitude below a predetermined level.

9. The transceiver according to claim 5 wherein said receiver further comprises means for automatically locking said generating means to the frequency of said emergency channel in response to the indication by said indicating means of the presence of a received signal on said emergency channel.

10. The transceiver according to claim 9 wherein said automatic locking means further includes means for inhibiting the operation of said control means in response to the reception of a signal corresponding in frequency to the frequency of said desired normal channel whereby said generating means becomes locked to said frequency of said normal channel.

11. The receiver according to claim 2 further comprising means for automatically locking said generating means to the frequency of said emergency channel in response to the indication by said indicating means of the presence of a received signal on said emergency channel.

12. The receiver according to claim 11 wherein said automatic locking means further includes means for inhibiting the operation of said control means in response to the reception of a signal corresponding in frequency to the frequency of said desired normal channel whereby said generating means becomes locked to said frequency of said normal channel.

* * * * *